July 2, 1963  H. KRASNE  3,095,593
FEATHER DUSTER
Filed Sept. 13, 1960

INVENTOR.
Henry Krasne

3,095,593
FEATHER DUSTER
Henry Krasne, 1609-11 Cuming St., Omaha 2, Nebr.
Filed Sept. 13, 1960, Ser. No. 55,760
1 Claim. (Cl. 15—234)

This invention relates generally to cleaning equipment, and more specifically to improvements relating to feather dusters.

A feather duster is a delicate but effective implement for commercial and household dusting needs. It is particularly effective in removing dust from delicate articles without danger of damage to such articles. In order to function with optimum efficiency, the feather duster should be kept protected when not in use.

It is therefore a primary object of this invention to provide a feather duster which may be simply retracted within its own plastic tube handle for storage and protective purposes.

It is a further object of this invention to provide a feather duster which is designed so that the feathers may be projected from a container and holder to the desired extent so as to present a dusting end.

It is a still further object of this invention to provide a feather duster and holder container which is efficient and effective in operation and which is attractive and pleasing in design.

The invention consists of a selected group of feathers which are retained by their quills around a cylindrical wooden plug. The plug has several annular grooves which are adapted to receive a binding wire wound tightly about the quills of the protruding feathers. The plug is slidably received in a cylindrical plastic casing which is closed at one end. A slot formed lengthwise in the tube receives an adjustable wing nut which passes therethrough and threadably engages in the plug to permit adjustable positioning of the plug with respect to the cylinder.

Further objects and advantages of this invention will become apparent from the following more detailed description of a preferred embodiment thereof, taken in conjunction with the attached drawings wherein.

Similar reference characters indicate corresponding parts throughout the several views in the drawing.

Figure 1:
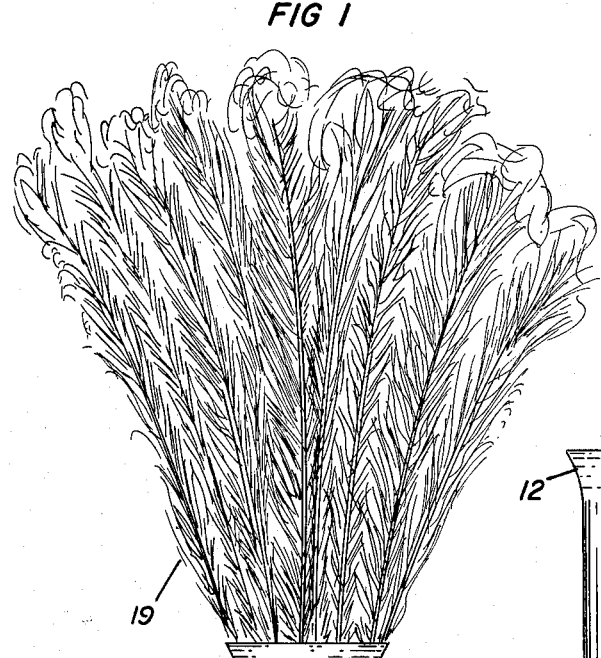
FIG. 1 is a front elevation of the duster and casing of my invention shown in a fully extended condition.
Figure 2:
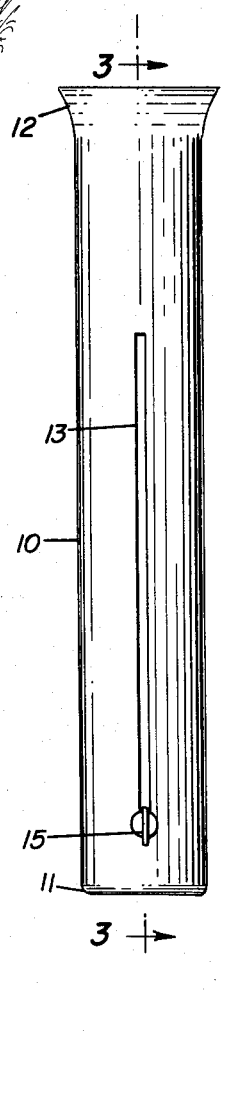
FIG. 2 is a front elevation of the device in a fully retracted condition.
Figure 3:
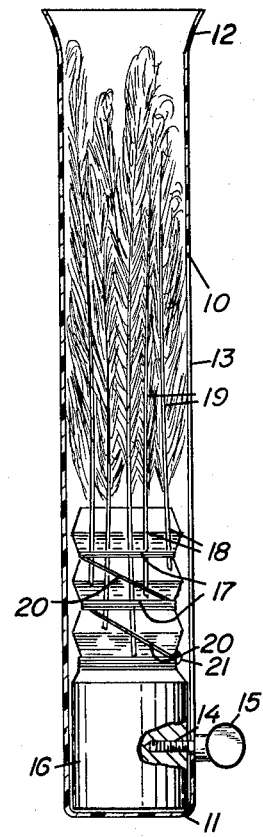
FIG. 3 is a side elevation partly in cross section taken along the line 3—3 of FIG. 2.

Referring now to the drawing in detail, the numeral 10 represents a cylindrical plastic casing having a closed base portion 11. The upper end of the casing is splayed as at 12 to form a smooth conical entry to the casing. A slot 13 is formed in an axial plane along the greater part of the casing length and is adapted to receive the threaded portion 14 of a wing nut or thumb screw 15.

A cylindrical plug 16 is adapted to slidably engage the inner surface of the cylindrical casing 10. One end of the plug is provided with a plurality of grooves 17 in equal and parallel spaced relation to each other. After the feathers 19 have been suitably oriented, the quills 18 are secured firmly around the end of the plug 16 by a wire 20 which is wound tightly in the successive annular grooves 17 and suitably anchored by a tack or pin 21. The aforesaid grooves 17, in which the wire 20 is wound, of course prevent the wire from coming into contact with the inside wall of the cylindrical plastic casing 10, when the cylindrical plug 16 is manually moved from end to end of the casing. A threaded hole is formed radially in the lower end of the plug to receive the threaded portion 14 of the thumb screw 15.

In operation, it will be readily seen that the feathers may be retracted or extended with respect to the casing by loosening and adjusting the thumb screw 15 to the desired degree along the length of the slot 13. In this manner complete protection is afforded during storage and the feathers may be projected the desired amount according to the delicacy and type of dusting to be performed.

The invention will provide considerable improvement over the conventional type duster used in the commercial trades. Grocery stock clerks, rack jobbers and bottlers, all have a perpetual task of dusting off their display counters as they move from store to store. An open duster used for such purposes rapidly becomes soiled and such soiling readily contaminates the operator's clothing or sample case if not protected in some efficient manner. The invention satisfies these needs for protection and compactness in transportation.

Having described the invention in a preferred form, it will be appreciated that some modifications may be made to the precise configuration, without departing from the scope or spirit of the invention, as defined by the following claim.

I claim:

A feather duster of the character described, comprising a cylindrical plastic casing having a closed base and a splayed opening in the upper end thereof, and a cylindrical plug slidably mounted within the said cylindrical plastic casing, the said plug having a series of annular spaced apart tapering grooves encompassing the upper end thereof, and in which is secured the quills of a plurality of feathers, and a wire encompassing the upper end of the said plug to which it is secured, the said wire encompassing said quills and lying in the said grooves which prevents the said wire from coming in contact with the inside wall of the said cylindrical plastic casing when the said cylindrical plug is manually moved from end to end of the said cylindrical casing, a thumb screw having one end secured in the lower portion of the said cylindrical plug and projecting outward through a longitudinally extending slot in the said cylindrical plastic casing, whereby the said feathers may be projected from the said splayed end of the said plastic casing when it is desired to dust an object, and retracted within the said splayed end of the said plastic casing when the said feather duster is to be stored.

References Cited in the file of this patent

UNITED STATES PATENTS

| | | |
|---|---|---|
| 156,324 | Anderson et al. | Oct. 27, 1874 |
| 212,732 | Nichols | Feb. 25, 1879 |
| 742,839 | Collins | Nov. 3, 1903 |
| 783,937 | Edwards et al. | Feb. 28, 1905 |
| 893,271 | Snevely | July 14, 1908 |
| 1,595,726 | Pierce | Aug. 10, 1926 |

FOREIGN PATENTS

| | | |
|---|---|---|
| 23,294 | Germany | Aug. 18, 1883 |
| 303,820 | Italy | Dec. 17, 1932 |
| 1,106,393 | France | July 30, 1955 |